United States Patent
Schiefelbein, Jr.

(10) Patent No.: US 8,356,660 B1
(45) Date of Patent: Jan. 22, 2013

(54) APPARATUS HAVING SPACED APART AND OFFSET LADDER RUNGS FOR INTERLOCKING AND FLEXIBLY RESTRAINING SERVICE LOOPS IN AN OIL DERRICK TO PREVENT ENTANGLING OF THE LOOPS

(75) Inventor: John P. Schiefelbein, Jr., Huntington Beach, CA (US)

(73) Assignee: Delafield Corporation, Duarte, CA (US)

( * ) Notice: Subject to any disclaimer, the term of this patent is extended or adjusted under 35 U.S.C. 154(b) by 296 days.

(21) Appl. No.: 12/803,511

(22) Filed: Jun. 28, 2010

(51) Int. Cl.
*E21B 19/00* (2006.01)

(52) U.S. Cl. .................................. 166/75.11; 166/77.1

(58) Field of Classification Search ............... 248/317, 248/315, 339, 340, 58, 60, 62, 63, 65, 68.1, 248/49; 166/75.11, 77.1, 207; 324/346
See application file for complete search history.

(56) References Cited

U.S. PATENT DOCUMENTS

| | | | | |
|---|---|---|---|---|
| 1,409,760 A | * | 3/1922 | O'Marr | 175/207 |
| 5,996,945 A | * | 12/1999 | Coles et al. | 248/68.1 |
| 7,909,091 B2 | * | 3/2011 | Schiefelbein, Jr. | 166/75.11 |
| 7,918,270 B2 | * | 4/2011 | Schiefelbein, Jr. | 166/75.11 |
| 8,016,028 B2 | * | 9/2011 | Schiefelbein, Jr. | 166/75.11 |
| 8,016,029 B2 | * | 9/2011 | Schiefelbein, Jr. | 166/75.11 |
| 2005/0236157 A1 | * | 10/2005 | Logan | 166/377 |

\* cited by examiner

*Primary Examiner* — Ramon Ramirez
*Assistant Examiner* — Todd M Epps
(74) *Attorney, Agent, or Firm* — Thomas I. Rozsa (57) ABSTRACT

In an oil derrick separate service loops which are power cables and/or hydraulic hoses are affixed at one end to a top drive and affixed at an opposite end to an oil derrick end, adding a series of polyurethane supports or rungs along the length of the separate service loops to provide a little lateral motion but to limit the overall amount of lateral motion. The rungs will also help insure that the cables and hoses do not wrap themselves around everything when the wind blows. In order to carry the weight of the cables, two parallel steel cables are affixed on either side of the copper cables, and two steel cables are affixed on either side of the hydraulic hoses. These steel cables will be terminated at the derrick and the top drive by being affixed to steel brackets received in steel mounting plates all designed to withstand the loads.

37 Claims, 5 Drawing Sheets

APPARATUS HAVING SPACED APART AND OFFSET LADDER RUNGS FOR INTERLOCKING AND FLEXIBLY RESTRAINING SERVICE LOOPS IN AN OIL DERRICK TO PREVENT ENTANGLING OF THE LOOPS

BACKGROUND OF THE INVENTION

1. Field of the Invention

The present invention is related to oil drilling equipment, and more particularly, to an apparatus having improved interlocking units to restrain cables which transfer electrical, hydraulic and compressed-air power to the oil derrick top drive. Multiplicity of such cables are combined into a service loop.

2. Description of the Prior Art

Figure 1:
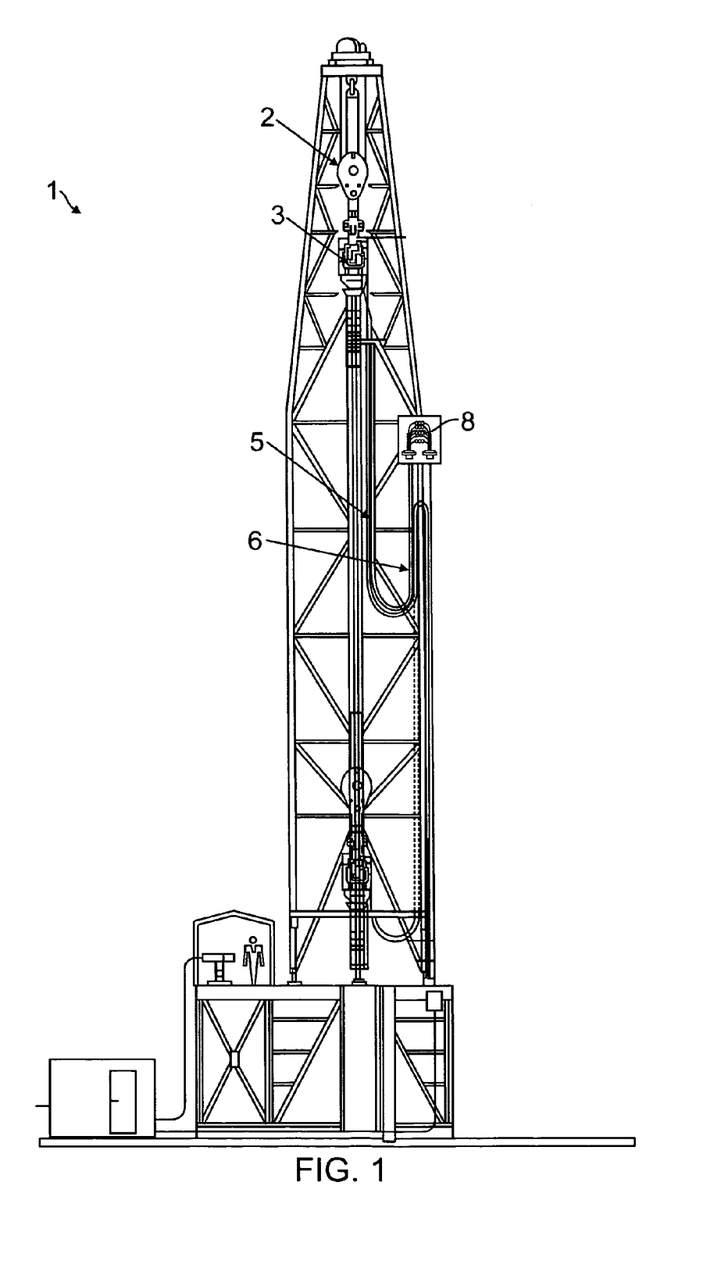
FIG. 1 is a schematic diagram of an oil well drilling tower to illustrate structural sections which are related to the present invention.

Referring to FIG. 1, there is illustrated a standard oil derrick having a top drive drilling system which has a notation number of 3 in FIG. 1, is a common piece of machinery in an oil well drilling tower 1 in the oil drilling industry. The top drive 3 includes an AC or DC motor or a hydraulic motor which is connected to a speed reducing (torque increasing) gearbox, so that it can rotate the drill pipe to bore an oil well. The top drive is mounted in the drilling derrick and travels up and down under a control of a piece of traveling equipment 2.

Referring again to FIG. 1, there is illustrated an umbilical system 6 which is commonly called service loops. The service loops 6 are part of hoses 5 of the machinery in the oil well drilling tower, where each of the hoses transfers the respective electrical, hydraulic and compressed-air power to the top drive. There are various combinations of hoses, wires and cables that pass through the inside diameters of the service loops. Most top drives utilize a combination of two to four service loops which have approximately equal length. Each service loop at one end is attached to the derrick (or mast) 8, and at the opposite end is connected to the top drive 3. As the top drive travels up and down, the service loops move accordingly up and down in the longitudinal direction. In addition, they have a bending movement in the transverse direction, which forms the respective bend radii.

The service loops 6 of the hoses vary from about 2 inches to 7 inches in diameter. In addition, there are also variations of the hose structure and materials according to their usages in the drilling process. For example, a hydraulic pressure could be up to 3000 psi, and therefore, a hose to transfer the hydraulic fluid must be mechanically enhanced by having a sufficient thickness and an appropriate material structure. In general, the service loops have a composite structure to achieve reinforced mechanical properties. The composite structure is comprised of an inner liner, a middle braid and an outer liner. The inner and outer liners are made of thermoplastic materials or rubber. The middle braid is the composite of the thermoplastics and enhanced polymeric threads or metal wires. Therefore, the mechanically enhanced hoses have large longitudinal rigidities.

It will be appreciated that due to the variations of the hose diameters, material and structure which all affect the longitudinal flexibility of the hoses, each service loop does not always have the same bend radius. The hoses having a smaller diameter usually have a smaller bend radius, and the hoses having a larger diameter have a larger bend radius. For example, in general, hoses with two inches in diameter will have 30 inches in bend radius, hoses having three inches in diameter will have a bend radius of 42 inches, and hoses having four and half inches in diameter will have a bend radius of 48 inches. Therefore, the bottoms of the service loops travel in different paths when all the loops having the same length travel in the longitudinal direction.

The variation in paths during operation of the machinery causes the loops to become entangled. When this happens, loops with the larger diameter have the tendency to force loops with the smaller diameter into unnatural positions, which results in premature failure of the loops with the smaller diameter. In this situation, an environmental condition such as a strong wind also plays a factor to accelerate the failure of the loops. In addition, in some cases two or more loops with the smaller diameter can displace a loop with the larger diameter, which can cause problems including broken loops.

If the loop failure happens, it will not only cause a loss in economic value due to costs to replace the damaged loops and down time for replacing the loops, but also create a hazardous situation such as leakage of the high pressured air or fluids to machine operators. Therefore, finding a solution to this problem becomes an industry priority.

The present inventor has developed one solution to the above problem which as described and claimed in pending patent application Ser. No. 12/157,093, is an apparatus for flexibly restraining service loops in an oil derrick to prevent entangling of the loops. The apparatus is comprised of a plurality of identical apparatus, wherein each apparatus is positioned at a different longitudinal level to restrain the service loops. Each apparatus is comprised of a plurality of interlocking units, wherein each unit is comprised of a central steel ring which is adhesively bonded to a braid of a service loop penetrating therethrough and exteriorly affixed to first and second interconnecting rings. A first flexible cable and second flexible cable connect the respective first and second interconnecting rings of the units of each apparatus. Therefore, the significant improvement disclosed and claimed in this pending application provided service loops which were flexibly restrained to facilitate a uniform path and bend radius when the service loops travel longitudinally during operation of an oil well drilling machine. This improvement provided a significant reduction in damage to the service loops during operation.

The invention in application Ser. No. 12/157,093 required retrofitting the service loops by opening up the outer covering and installing the improvement. This could not be performed on site in the field and required installation at an off-site location. The present inventor addressed this problem in pending continuation-in-part application Ser. No. 12/590,635 wherein the interlocking units can be assembled over the outer covering of the service loops and therefore can be installed on-site.

These two pending applications by the same inventor have provided significant improvements in cable restraint systems for oil derricks. However, it has been discovered that sometimes the present inventor's prior inventions may create the following problems:

(1) when cables are encased in an outer hose, the heating from the cables is trapped, and therefore the ampacity of the individual cables must be reduced;

(2) the outside diameter of the outer hose limits the bend radius of the service loop; and (3) if a cable or hose fails, the individual cable or hose cannot be replaced on site.

In order to overcome the above limitations, some top drive manufacturers decided to hang individual cables and hoses in the derrick, forgoing the use of an outer hose. In order to restrain these individual cables and keep them from blowing all over the derrick, these top drive manufacturers started to tie the individual cables together using various clamps, and in some cases, a cable track. However, these clamps and cable tracks had the following disadvantages:

(1) the clamps are made of pieces of wood or rubber bolted together. If they come loose, they can fall and injure an oil derrick worker;
(2) sometimes the clamps wear through the cable insulation causing cable failure;
(3) in appearance, these devices are unattractive;
(4) when a steel cable track is used, the material holding the cables (or hoses) can wear through the cable insulation resulting in a major electrical short and other electrical problems when the high voltage line in the cable and the grounded steel cables of the cable track come in contact with each other. The cable tracks are made of steel with the electrical cables and hydraulic hoses tie-wrapped or clamped to the steel cross supports. The constant flexing wears at the electrical cable insulation and eventually wears through. 600 VAC and 1800 amps will make a large electrical spark;
(5) the steel cable tracks have a fairly large minimum bend radius, almost as large as typical hose-type service loops;
(6) cable tracks do not allow for lateral offset—the cable tracks only accept bending or offset in one direction (which is a reason clamps are used instead of cable tracks). The cable tracks are therefore subject to a lot of vibration and motion from the top drive. All this motion wears on the track links or joints; and
(7) cable tracks are bolted or riveted together and these parts may come loose and fall on workers on the oil derrick.

Therefore, while other top drive manufacturers have provided some advantages over the patent pending designs of the present inventor which advantages include small bend radius, increased ampacity of electrical cables, and improve serviceability, they also have significant problems including falling hardware, short life, electrical sparking and shorts, and limited motion (in the case of a cable track).

There is a significant need for an improved apparatus to restrain service loops while avoiding the problems associated with the above discussed prior designs.

SUMMARY OF THE INVENTION

The present invention is an apparatus for flexibly restraining steel cables, electrical cables and hydraulic hoses in an oil derrick to prevent entangling of the multiplicity of cables which form a service loop, comprising a plurality of identical apparatus, wherein each apparatus is positioned at different longitudinal levels to restrain the cables and hoses in a given service loop, so that the service loops will have the same path and bend radius when they travel longitudinally during operation of an oil well drilling machine to minimize damage of the service loops.

In a preferred embodiment of the present invention, a multiplicity of spaced apart rungs made out of rubber-like material, preferably urethane castings which are cast to the steel cables, electrical cables and hoses along the length of the service loops to tie the members together and add some resistance to the wind. The spaced apart urethane castings appear like rungs on a ladder. Since the polyurethane rungs are cast to the steel cables, electrical cables and hoses, they will not fall off due to vibration or lack of maintenance. The rungs will also act as electrical insulators since urethane has a high dielectric resistance. While polyurethane is preferred material, the rungs can also be made out of other rubber-like material.

The use of the present invention spaced apart cast polyurethane rungs permits use of individual cables or hoses so the bend radius can be minimized and the cables are in free air. Since the cables are in free air, ampacity is not reduced and therefore, derating or reduced ampacity will not have to occur.

The use of the present invention spaced apart cast polyurethane rungs facilitates lateral offset of the cables and hoses. Since the rungs are made of abrasion resistant materials, they can absorb contact with various structures without failure. The urethane can be formulated with around 3000 to 5000 psi tensile strength which will hold all electrical cables, steel cables and hoses in place.

In addition to the spaced apart cast urethane rungs, the present invention incorporates the use of two steel cables (one on each side) respectively affixed into mounting plates respectively received into mounting brackets on the top drive and on the derrick, the two steel cables at the top drive and the two steel cables at the derrick used to carry the tensile loads from the weight of the cables and hoses.

One disadvantage of the cast rungs is that cables or hoses cannot be individually replaced at the site of the oil derrick. In an alternative embodiment, the rungs can be in two separate halves affixed together around the steel cables, electrical cables, and hoses. The rungs can be removed by releasing the affixation means which affixed the two halves of the rungs together. With the rungs released, the cables or hoses can be removed for replacement at the site of the derrick.

In summary, the present invention is to hang the individual cables in the derrick to the top drive, but also add a series of polyurethane supports or rungs along the length to provide a little lateral motion but to limit the overall amount of lateral motion. The rungs will also help insure that the cables and hoses do not wrap themselves around everything when the wind blows. In order to carry the weight of the service loop, two parallel steel cables are affixed on either side of the copper cables and the hydraulic hoses. These steel cables will be terminated at the derrick and the top drive by being affixed to steel bracelets received in steel mounting plates all designe to withstand the loads.

It is therefore an object of the present invention to provide an apparatus for flexibly restraining steel cables, electrical cables and hydraulic hoses in an oil derrick to prevent entangling of the multiplicity of cables which form a service loop, with at least two service loop in an oil derrick comprising a plurality of identical apparatus, wherein each apparatus is positioned at different longitudinal levels to restrain the service loops, so that the service loops will have the same path and bend radius when they travel longitudinally during operation of an oil well drilling machine to minimize damage of the service loops.

It is also an object of the present invention to provide a multiplicity of spaced apart urethane castings which are cast to the steel cables, electrical cables and hoses along the length of the service loops to tie the members together and add some resistance to the wind. The spaced apart urethane castings appear like rungs on a ladder.

It is a further object of the present invention to provide the polyurethane rungs which are cast to the steel cables, electrical cables and hoses, so that they will not fall off due to vibration or lack of maintenance.

It is also an object of the present invention to provide spaced apart polyurethane rungs which also function as electrical insulators since urethane has a high dielectric resistance.

It is additionally an object of the present invention to provide spaced apart cast polyurethane rungs which thereby permits use of individual cables or hoses so the bend radius can be minimized and the cables are in free air. Since the cables are in free air, ampacity is not reduced and therefore derating or reduced ampacity will not have to occur.

It is also an object of the present invention to use spaced apart cast polyurethane rungs which facilitates lateral offset of the cables and hoses. Since the rungs are made of abrasion resistant materials, they can absorb contact with various structures without failure. The urethane can be formulated with around 3000 to 5000 psi tensile strength which will hold all electrical cables, steel cables and hoses in place.

It is a further object of the present invention to incorporate the use of two steel cables (one on each side) respectively affixed into mounting plates respectively received into mounting brackets on the top drive and on the derrick, the two steel cables at the top drive and the two steel cables at the derrick used to carry the tensile loads from the weight of the cables and hoses.

It is another object of the present invention to provide an alternative embodiment wherein the rungs can be in two separate halves affixed together around the steel cables, electrical cables, and hoses. The rungs can be removed by releasing the affixation means which affixed the two halves of the rungs together. With the rungs released, the cables or hoses can be removed for replacement at the site of the derrick.

The key object of the present invention is to attach the individual cables in the derrick to the top drive, but also to add a series of polyurethane supports or rungs along the length to provide a little lateral motion but to limit the overall amount of lateral motion. The rungs will also help insure that the cables and hoses do not wrap themselves around everything when the wind blows. In order to carry the weight of the cables, two parallel steel cables are affixed on either side of the copper cables, and two steel cables are affixed on either side of the hydraulic hoses. These steel cables will be terminated at the derrick and the top drive by being affixed to steel brackets received in steel mounting plates, all designed to withstand the loads.

The attached drawings represent the two (2) described service loops, an inner loop place inside of the outer loop's bend radius. In this way, multiple loops can be retained from top drive to derrick without increasing the overall width of the service loop Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of exampl only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

In an oil derrick having separate service loops which can be power cables and/or hydraulic hoses, wherein the individual cables in the derrick are affixed at one end to the top drive and affixed at their opposite end to a derrick end, the invention is to add a series of supports or rungs along the length of the separate cables in each service loop to provide a little lateral motion but to limit the overall amount of lateral motion. The rungs are made out of rubber-like material and are preferably cast polyurethane. The rungs will also help insure that the cables and hoses do not wrap themselves around everything when the wind blows. In order to carry the weight of the cables, two parallel steel cables are affixed on either side of the copper cables, and two steel cables are affixed on either side of the hydraulic hoses. These steel cables will be terminated at the derrick and the top drive by being affixed to steel brackets received in steel mounting plates all designed to withstand the loads.

Figure 3:
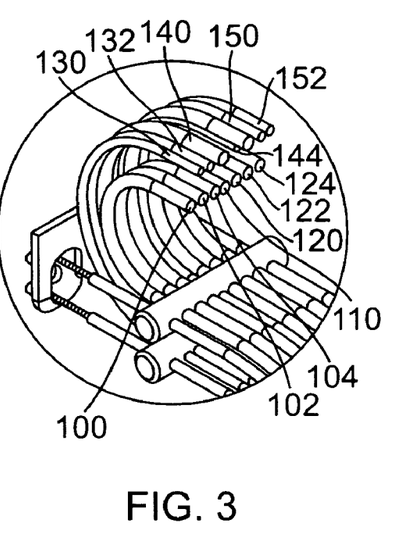
FIG. 3 is an enlarged view to illustrate the specific electrical cables, steel cables and hydraulic hoses.

Referring first to FIG. 3, there is illustrated an enlarged view of one embodiment of service loops of an oil derrick illustrating electrical cables, steel cables and hydraulic hoses which combined are formed into a service loop, with two service loops illustrated in FIG. 3. It is within the spirit and scope of the present invention to have one service loop with all fluid hoses and one service loop with all electrical cables or a service loop can be mixed and have both electrical cables and fluid hoses in a service loop. The mixing of various cables and hoses it a service loop facilitates making the loops as space efficient as possible.

Referring to FIG. 3, by way of example, the lower or inner row service loop comprises parallel power cables 100, 102 and 104, a steel grounding cable 110, and power cables 120, 122 and 124. The power cables 100, 102, 104, 120 122 and 124 can have varying electrical ampacities. By way of example, the second or outer row service loop comprises hydraulic hoses 130 and 132, power cable 140, fiber optic 142, hydraulic hoses 150 and 152 and power cable 160. It will be appreciated that this is only one of many configurations of power cables, cables and hoses for a service loop configuration with which the present invention is used.

Figure 2:
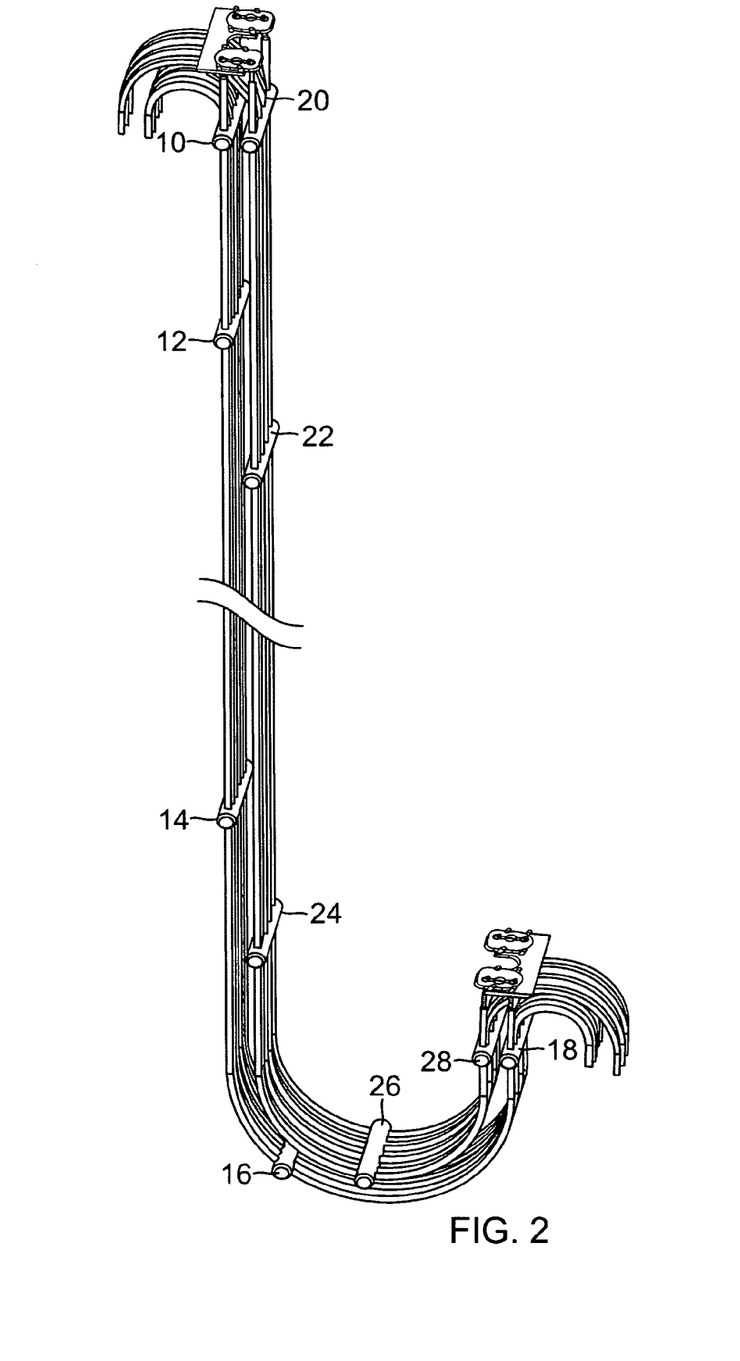
FIG. 2 is a perspective view of the service loops including electrical cables, steel cables, and hydraulic hoses, all retained by the present invention spaced apart cast polyurethane rungs and supported at the top drive and derrick by steel cables affixed to mounting bracket received in mounting plates.

Referring to FIG. 2, the key innovation of the present invention is the incorporation of spaced apart polyurethane rungs which are cast onto the service loop power cables, cables and hydraulic hoses. By way of example, rungs 10, 12, 14, 16 and 18 are cast onto the service loop forming the lower row of primarily power cables at spaced apart locations. Rungs 20, 22, 24, 26 and 28 are cast onto the service loop forming the upper row of hydraulic hoses and power cables. By way of example only, each rung 10, 12, 14, 16 and 18 can be spaced apart from an adjacent rung by any desired distance such as from 4 feet to 20 feet. It is believed that a 10-foot space may be best. By way of example only, each rung 20, 22, 24, 26 and 28 can be spaced apart from an adjacent rung by any desired distance such as from 4 feet to 20 feet. It is believed that a 10 foot spaced may be best. Each rung 10, 12, 14, 16, 18, 20, 22, 24, 26 and 28 is preferably cylindrical and can range in diameter from 2 inches to 6 inches with 4 inches being referred.

The present invention rungs 10, 12, 14, 16, 18, 20, 22, 24, 26 and 28 are an apparatus for flexibly restraining steel cables, electrical cables and hydraulic hoses in an oil derrick to prevent entangling of the loops, comprising a plurality of identical rungs wherein each rung is positioned at different longitudinal levels to restrain the service loops 100, 102, 104 110, 120, 122, 124, 130 132 and 140, so that the service loops will have the same path and bend radius when they travel longitudinally during operation of an oil well drilling machine to minimize damage of the service loops.

The multiplicity of spaced apart rungs made out of rubber-like material such as urethane castings 10, 12, 14, 16, 181, 20, 22, 24, 26 and 28 are each cast to the steel cables, electrical cables and hoses along the length of the service loops to tie the members together and add some resistance to the wind. The spaced apart urethane castings appear like rungs on a ladder. Since the polyurethane rungs are cast to the steel cables, electrical cables and hoses, they will not fall off due to vibration or lack of maintenance. The rungs will also be electrical insulators since urethane has a high dielectric resistance.

The use of the present invention spaced apart cast rubber-like material, preferably polyurethane rungs permits use of individual cables or hoses such as 100, 102, 104, 110, 120, 122, 124 130, 132 and 140, so the bend radius can be minimized and the cables are in free air. Since the cables are in free air, ampacity of the power cable such as 100, 102, 104 120, 122, 124 and 140 is not reduced and therefore, derating or reduced ampacity will not have to occur. The rungs are made of material selected from the group consisting of polyurethane, urethane and rubber-like material.

The use of the present invention spaced apart cast polyurethane rungs facilitates lateral offset of the cables and hoses. Since the rungs are made of abrasion resistant materials, they can absorb contact with various structures without failure. The urethane can be formulated with around 3000 to 5000 psi tensile strength which will hold all electrical cables, steel cables and hoses in place.

The rungs of the present invention are cast around each of the hoses/cables in each individual service loop. The rungs are cast around each set of hoses/cables that make up that loop. In most installations there will be two service loops—one loop inside the bend radius of the other, as illustrated in FIG. 2. Rungs will be spaced out to transfer the cables/hoses weight into steel ropes and to guide the cables/hoses as they move up and down.

The rungs can also be affixed to adjacent structures on the oil derrick.

In addition to the spaced apart cast urethane rungs, the present invention incorporates the use of two steel cables (one on each side) respectively retained in a receiving opening in mounting plates respectively received into mounting brackets on the top drive and on the derrick, the two steel cables at the top drive and the two steel cables at the derrick used to carry the tensile loads from the weight of the cables and hoses.

Figure 4:
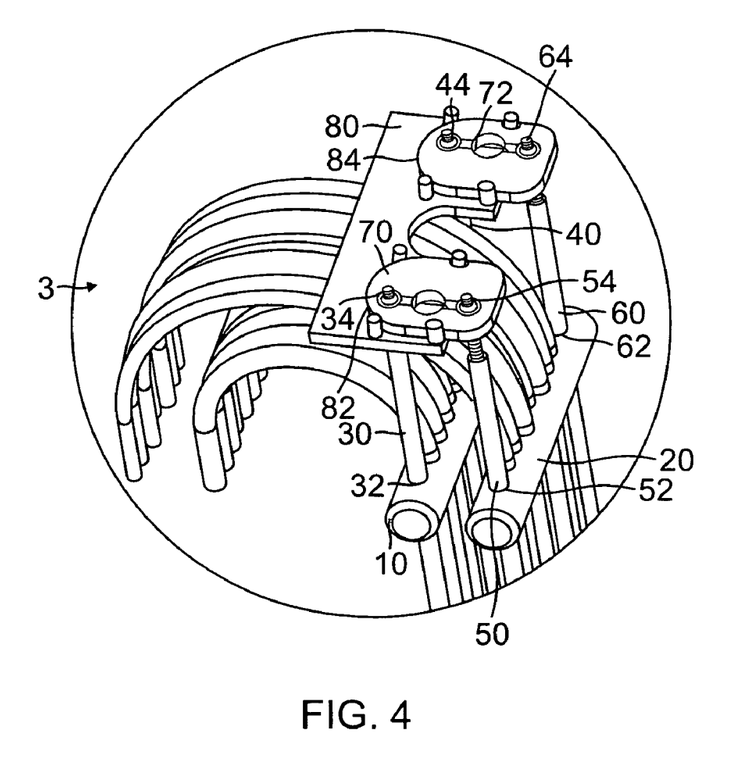
FIG. 4 is an enlarged view of the ends of the cables and hoses supported at the top drive end by steel cables affixed to mounting brackets received in a mounting plate affixed to the top drive.

Referring to FIG. 4 which is an enlarged view of the top drive end 3, a first steel cable 30 has a first end 32 affixed to rung 10 surrounding the power cables and a second end 34 retained at or adjacent the second end 34 in a retaining opening of first mounting plate 70 which in turn is received and retained in a first receiving opening 82 of mounting bracket 80 which is affixed to the top drive 3. The first steel cable 30 is positioned to one side of the power cables. Located at the opposite side of the power cables is a second steel cable 40 having a first end affixed to rung 10 and a second end 44 retained at or adjacent the second end 44 in a retaining opening of second mounting plate 72 which in turn is received and retained in second receiving opening 84 of mounting bracket 80 which is affixed to top drive 3.

A third steel cable 50 has a first end 52 affixed to rung 20 surrounding the hoses and a second end 54 retained at or adjacent the second end 54 in a retaining opening of the first mounting plate 70 which in turn is received and retained in a first receiving opening 82 of mounting bracket 80 affixed to the top drive 3. The third steel cable 50 is positioned to one side of the hoses. Located at the opposite side of the hoses is a fourth steel cable 60 having a first end 62 affixed to rung 20 and a second end 64 retained at or adjacent the second end 64 in a retainin opening of the affixed to a second mounting plate 72 which in turn is received and retained in a second receiving opening 84 of mounting bracket 80 affixed to the top drive 3.

First steel cable 30 is parallel to and positioned at a spaced apart location from third steel cable 50. Steel cables 30 and 50 are affixed at spaced apart locations on mounting bracket 70. Similarly, second steel cable 40 is parallel to and positioned at a spaced apart location from fourth steel cable 60. Steel cables 40 and 60 are affixed at spaced apart locations on mounting bracket 72.

Figure 5:
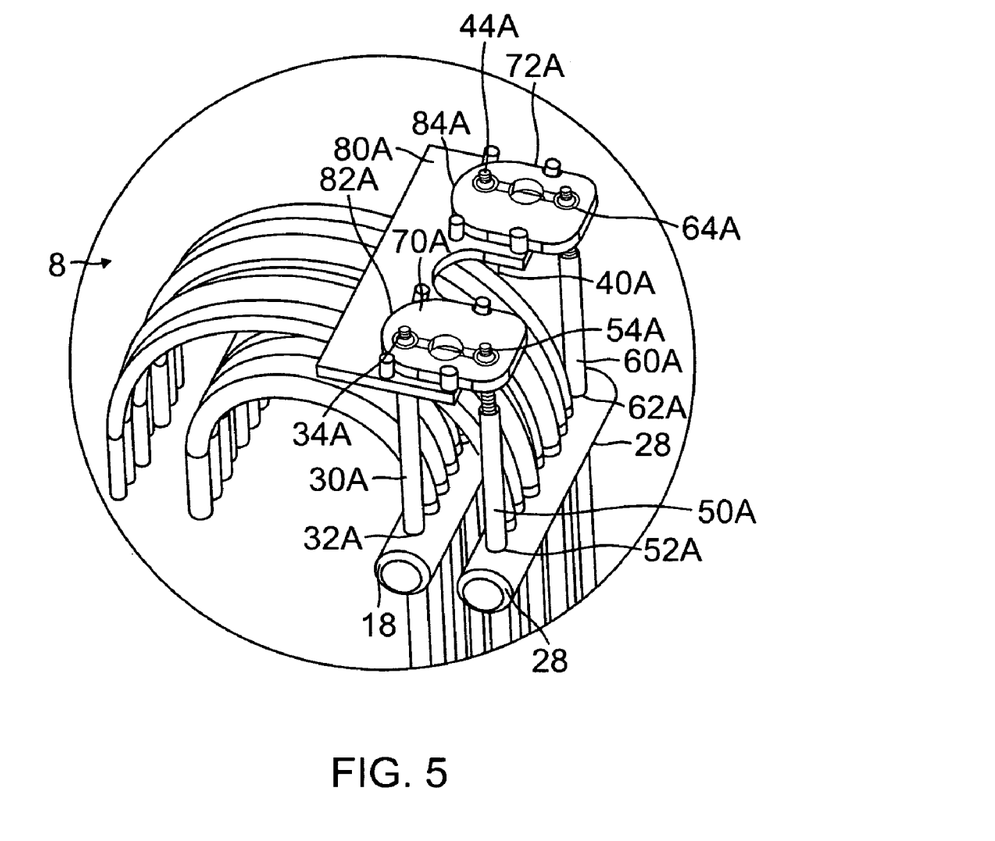
FIG. 5 is an enlarged view of the ends of the cable and hoses supported at the derrick end by steel cables affixed to mounting brackets receiving in a mounting plate affixed to the derrick end.

Referring to FIG. 5 which is an enlarged view of the derrick end 8, a fifth steel cable 30A has a first end 32A affixed to rung 18 surrounding the power cables and a second end 34A retained at or adjacent the second end 34A in a retaining opening of a third mounting plate 70A which in turn is received and retained in a first receiving opening 82A of mounting bracket 80A affixed to the derrick 8. The fifth steel cable 50A is positioned to one side of the power cables. Located at the opposite side of the power cables is a sixth steel cable 40A having a first end affixed to rung 18 and a second end 44A retained at or adjacent the second end 44A in a retaining opening of a fourth mounting plate 72A which in turn is received and retained in a second receiving opening 84A of mounting bracket 80A affixed to the derrick 8.

A seventh steel cable 50A has a first end 52A affixed to rung 28 surrounding the hoses and a second end 54A retained at or adjacent the second end 54A in a retaining opening of the third mounting plate 70A which in turn is received and retained in a first receiving opening 82A of mounting bracket 80A affixed to the derrick 8. The seventh steel cable 50A is positioned to one side of the hoses. Located at the opposite side of the hoses is an eighth steel cable 60A having a first end 62A affixed to rung 28 and a second end 64A retained at or adjacent the second end 64A in a retaining opening of the fourth second mounting plate 72A which in turn is received and retained in a second receiving opening 84A of mounting bracket 80A affixed to derrick 8.

Fifth steel cable 30A is parallel to and positioned at a spaced apart location from seventh steel cable 50A. Steel cables 30A and 50A are affixed at spaced apart locations on mounting bracket 70A. Similarly, sixth steel cable 40A is parallel to and positioned at a spaced apart location from eighth steel cable 60A. Steel cables 40A and 60A are affixed at spaced apart locations on mounting bracket 72A.

Figure 6:
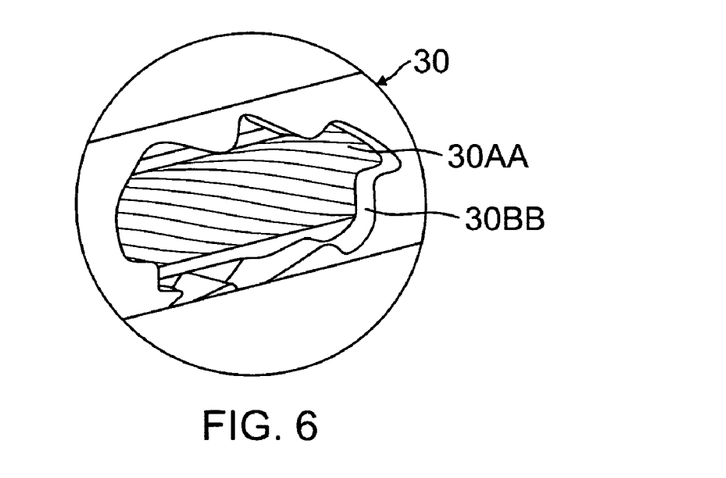
FIG. 6 is a cross-sectional view of a supporting steel cable.
Figure 7:
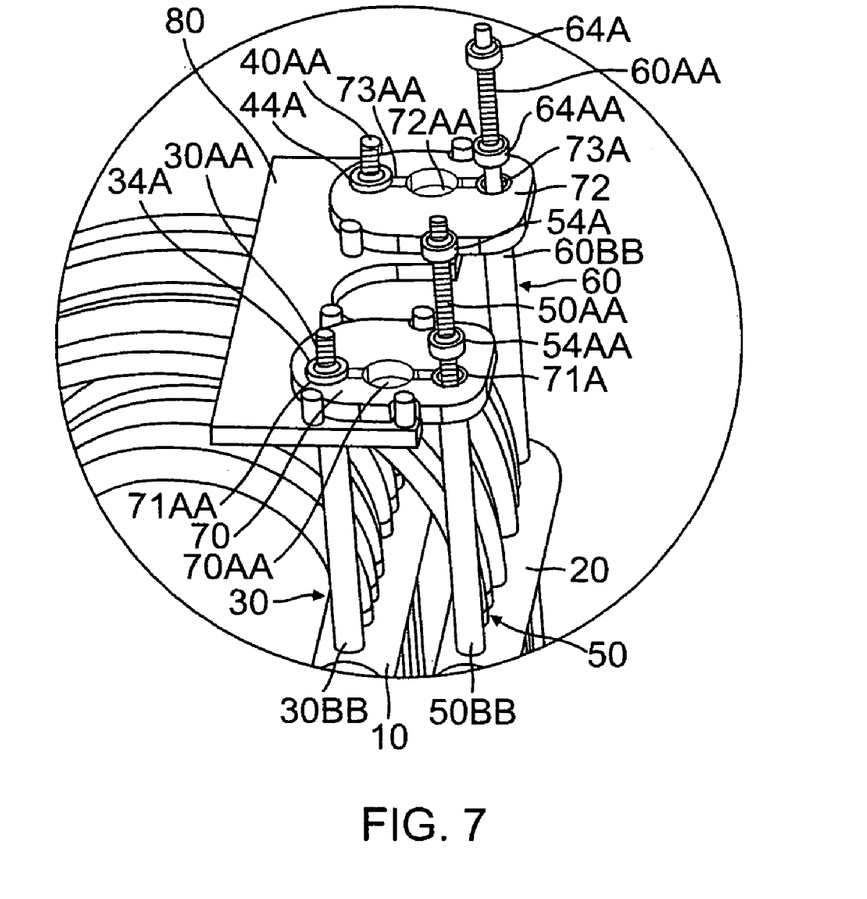
FIG. 7 is an enlarged view of the supporting steel cables respectively affixed to an uppermost rung at one end and retained at the steel cables respective opposite end to a mounting plate which in turn is retained in a mounting bracket which is affixed to the top drive.

The composition of the steel cables or steel ropes 30, 40, 50, 60, 30A, 40A, 50A and 60A and the mounting brackets is illustrated in greater detail in FIGS. 6 and 7. Referring to FIG. 6, each steel cable or steel rope (using cable 30 as an illustration) has an inner steel rope 30AA encased in a rubber hose 30BB and potted together. The rubber hose 30BB acts as a bumper, or insulator, for the steel rope 30AA. In this way, the rubber hose 30BB prevents the steel rope 30AA from directly rubbing on various components in the derrick as the top drive goes up and down.

Referring to FIG. 7, there is illustrated the components of the mounting plate and steel ropes affixed to the top drive. Steel cable 30 has an inner steel rope 30AA and outer rubber hose 30BB. Steel cable 40 has an inner steel rope 40AA and outer rubber hose (not shown). Steel cable 50 has an inner steel rope 50AA and outer rubber hose 50BB. Steel cable 60 has an inner steel rope 60AA and outer rubber hose 60BB. Steel cables 50 and 60 are cast into uppermost rung 20 and steel cables 30 and 40 are cast into uppermost rung 10.

On the ends of the steel ropes are steel disks. The steel rope passes through the disks, and then the disks are welded to the steel rope (putting the weld in shear). The uppermost disks are 34A, 44A, 54A and 64A. Each steel rope has a spaced apart lower disk of which 54AA and 64AA are illustrated in FIG. 7. (It is within the spirit and scope of the present invention to have several spaced apart disks on each steel rope). Support plate 70 has a large center hole 70AA which extends to oppositely disposed smaller holes 71A and 71AA. Support plate 72 has a large center hole 72AA which extends to oppositely disposed smaller holes 73A and 73AA. The disks with the steel rope welded to them are then inserted through a respective large hole in the support plates and then seated in a recess (or socket) smaller hole machined into the support plate. In this way, the loop's weight is transferred into the steel rope, into the steel disks, and then into the support plates. Each support plate 70 and 72 is retained in a support bracket 80. The support bracket 80 is welded to the top drive (or the derrick for the embodiment illustrated in FIG. 5). The distance disks such as 54A and 54AA can be several inches such as 9 inches. This will allow the installer to shorten (or lengthen) the suspended length of the two service loops to prevent the two loops from coming in contact with each other at the bottom of the bending radius. Therefore, either upper disks 34A, 44A, 54A and 64A are retained against their respective mounting bracket or a lower disk such as 54AA and 64AA is retained against a mounting bracket to shorten the distance of the service loop. The weight of the service loops retains the disk against the support plate. The steel ropes and the hoses/cables will lay parallel to each other in each loop.

The configuration for the opposite steel cables adjacent the derrick end 8 is the same as illustrated in FIG. 7, with each lower steel cable 30A, 40A, 50A and 60A having at least one or several spaced apart disks welded onto an interior steel rope with a disk retained against a receiving opening a respective mounting bracket.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method show is intended only for illustration and disclosure of an operative embodiment and not to show all of the various forms or modifications in which this invention might be embodied or operated.

What is claimed is:

1. An apparatus to be used with service loops having a multiplicity of separate power cables in a given service loop, a multiplicity of separate hoses in a given service loop, or a combination of power cables and hoses in a given service loop, each separate service loop having a given length and an outer diameter, the multiplicity of power cables, hoses, or combination power cables and hoses in each service loop aligned lengthwise in parallel in a given row, the apparatus comprising:
  a. a first multiplicity of spaced apart rungs, each rung respectively cast onto each power cable, hose, or combination power cables and hoses on an aligned row of a service loop and separated from an adjacent rung by a given lengthwise distance on the row of power cables, hoses, or combination power cables and hoses, said first multiplicity of spaced apart rungs reducing lateral movement of the power cables, hoses, or combination power cables and hoses forming a first service loop; and
  b. a second multiplicity of spaced apart rungs, each rung respectively cast onto each power cable, hose, or combination power cables and hoses on an aligned row of a service loop and separated from an adjacent rung by a given lengthwise distance on the row of power cables, hoses, or combination power cables and hoses, said second multiplicity of spaced apart rungs reducing lateral movement of the power cables, hoses, or combination power cables and hoses forming a second service loop,
  c. an oil derrick including a top drive, the row of the multiplicity of power cables, hoses, or combination power cables, hoses, or combination power cables and hoses of the first service loop having a first end adjacent the top drive, a given first rung located a given distance from the top drive;
  d. the top drive having a mounting bracket affixed to the top drive, the mounting bracket having a first receiving opening and a spaced apart second receiving opening.

2. The apparatus in accordance with claim 1 further comprising:
  a. a first steel cable affixed at one end to the first rung and retained at or adjacent its opposite end to a first mounting plate which is retained in the first receiving opening of the mounting bracket, the first steel cable positioned adjacent one lengthwise side of the first service loop; and
  b. a second steel cable affixed at one end to the first rung and retained at or adjacent its opposite end to a second mounting plate which is retained in the second receiving opening of the mounting bracket, the second steel cable positioned adjacent a lengthwise side of the first service loop opposite to the lengthwise side where the first steel cable is positioned.

3. The apparatus in accordance with claim 2 further comprising:
  a. the first steel cable formed of an interior steel rope at least partially encased in a rubber hose and having a disk affixed to the inner steel rope by which the first steel cable is retained on the first mounting plate; and
  b. the second steel cable formed of an interior steel rope at least partially encased in a rubber hose and having a disk affixed to the inner steel rope by which the second steel cable is retained on the second mounting plate.

4. The apparatus in accordance with claim 2 further comprising:

a. the first steel cable formed of an interior steel rope at least partially encased in a rubber hose and having at least a pair of spaced apart disks affixed to the inner steel rope, the first steel cable is retained on the first mounting plate by one of the disks; and b. the second steel cable formed of an interior steel rope at least partially encased in a rubber hose and having at least a pair of spaced apart disks affixed to the inner steel rope, the second steel cable is retained on the second mounting plate by one of the disks.

5. The apparatus in accordance with claim 2 further comprising:

a. the row of the multiplicity of power cables, hoses, or combination power cables and hoses of the second service loop having a first end adjacent the top drive, a given first rung located a given distance from the top drive;

b. a third steel cable affixed at one end to the first rung and retained at or adjacent its opposite end to the first mounting plate which is retained in the first receiving opening of the mounting bracket, the third steel cable positioned adjacent one lengthwise side of the second service loop; and c. a fourth steel cable affixed at one end to the first rung and retained at or adjacent its opposite end to the second mounting plate which is retained in the second receiving opening of the mounting bracket, the fourth steel cable positioned adjacent a lengthwise side of the second service loop opposite to the lengthwise side where the third steel cable is positioned.

6. The apparatus in accordance with claim 5 further comprising:

a. the third steel cable formed of an interior steel rope at least partially encased in a rubber hose and having a disk affixed to the inner steel rope by which the third steel cable is retained on the first mounting plate; and b. the fourth steel cable formed of an interior steel rope at least partially encased in a rubber hose and having a disk affixed to the inner steel rope by which the fourth steel cable is retained on the first mounting plate.

7. The apparatus in accordance with claim 5 further comprising:

a. the third steel cable formed of an interior steel rope at least partially encased in a rubber hose and having at least a pair of spaced apart disks affixed to the inner steel rope, the third steel cable is retained on the first mounting plate by one of the disks; and b. the fourth steel cable formed of an interior steel rope at least partially encased in a rubber hose and having at least a pair of spaced apart disks affixed to the inner steel rope, the fourth steel cable is retained on the second mounting plate by one of the disks.

8. The apparatus in accordance with claim 1 further comprising:

a. the oil derrick including an oil derrick end, the row of the multiplicity of power cables, hoses, or combination power cables and hoses of the first service loop having a second end adjacent the oil derrick end, a given last rung located a given distance from the oil derrick end;

b. the oil derrick end having a mounting bracket affixed to the oil derrick end, the mounting bracket having a third receiving opening and a spaced apart fourth receiving opening;

c. a fifth steel cable affixed at one end to the last rung and retained at or adjacent its opposite end to a third mounting plate which is retained in the third receiving opening of the mounting bracket, the fifth steel cable positioned adjacent one lengthwise side of the first service loop; and d. a sixth steel cable affixed at one end to the last rung and retained at or adjacent its opposite end to a fourth mounting plate which is retained in the fourth receiving opening of the mounting bracket, the sixth steel cable positioned adjacent a lengthwise side of the first service loop opposite to the lengthwise side where the fifth steel cable is positioned.

9. The apparatus in accordance with claim 8 further comprising:

a. the fifth steel cable formed of an interior steel rope at least partially encased in a rubber hose and having a disk affixed to the inner steel rope by which the fifth steel cable is retained on the third mounting plate; and b. the sixth steel cable formed of an interior steel rope at least partially encased in a rubber hose and having a disk affixed to the inner steel rope by which the sixth steel cable is retained on the fourth mounting plate.

10. The apparatus in accordance with claim 8 further comprising:

a. the fifth steel cable formed of an interior steel rope at least partially encased in a rubber hose and having at least a pair of spaced apart disks affixed to the inner steel rope, the fifth steel cable is retained on the third mounting plate by one of the disks; and b. the sixth steel cable formed of an interior steel rope at least partially encased in a rubber hose and having at least a pair of spaced apart disks affixed to the inner steel rope, the sixth steel cable is retained on the fourth mounting plate by one of the disks.

11. The apparatus in accordance with claim 8 further comprising:

a. the row of the multiplicity of power cables, hoses, or combination power cables and hoses forming the second service loop having a second end adjacent the oil derrick end, a given last hose rung located a given distance from the oil derrick end;

b. a seventh steel cable affixed at one end to the last hose rung and retained at or adjacent its opposite end to the third mounting plate which is retained in the third receiving opening of the mounting bracket, the seventh steel cable positioned adjacent one lengthwise side of the second service loop; and c. an eighth steel cable affixed at one end to the last rung and retained at or adjacent its opposite end to the fourth mounting plate which is retained in the fourth receiving opening of the mounting bracket, the eighth steel cable positioned adjacent a lengthwise side of the second service loop opposite to the lengthwise side where the seventh steel cable is positioned.

12. The apparatus in accordance with claim 11 further comprising:

a. the seventh steel cable formed of an interior steel rope at least partially encased in a rubber hose and having a disk affixed to the inner steel rope by which the seventh steel cable is retained on the third mounting plate; and b. the eighth steel cable formed of an interior steel rope at least partially encased in a rubber hose and having a disk affixed to the inner steel rope by which the eighth steel cable is retained on the fourth mounting plate.

13. The apparatus in accordance with claim 11 further comprising:

a. the seventh steel cable formed of an interior steel rope at least partially encased in a rubber hose and having at least a pair of spaced apart disks affixed to the inner steel rope, the seventh steel cable is retained on the third mounting plate by one of the disks; and
  b. the eighth steel cable formed of an interior steel rope at least partially encased in a rubber hose and having at least a pair of spaced apart disks affixed to the inner steel rope, the eighth steel cable is retained on the fourth mounting plate by one of the disks.

14. The apparatus in accordance with claim 1 wherein each rung is made out of material selected from the group consisting of polyurethane, urethane and rubber-like material.

15. An apparatus to be used with a multiplicity of separate service loops each separate service loop having a given length and an outer diameter, each service loop having aligned power cables, aligned hoses, or a combination of aligned power cables and hoses, the multiplicity of power cables, hoses, or combination of power cables and hoses in each separate service loop aligned lengthwise in parallel in a row, the apparatus comprising:
  a. a multiplicity of spaced apart rungs, each rung cast onto respective aligned power cables, aligned hoses, or aligned combination power cables and hoses in each separate service loop and separated from an adjacent rung by a given lengthwise distance on the separate service loop, the multiplicity of spaced apart rungs reducing lateral movement of the separate service loop;
  b. an oil derrick including a top drive, the row of the multiplicity of power cables, hoses, or combination power cables, hoses, or combination power cables and hoses of the first service loop having a first end adjacent the top drive, a given first rung located a given distance from the top drive;
  c. the top drive having a mounting bracket affixed to the top drive, the mounting bracket having a first receiving opening and a spaced apart second receiving opening.

16. The apparatus in accordance with claim 15 further comprising:
  a. a first steel cable affixed at one end to the first rung and retained at or adjacent its opposite end to a first mounting plate which is retained in the first receiving opening of the mounting bracket, the first steel cable positioned adjacent one lengthwise side of the separate service loop; and
  b. a second steel cable affixed at one end to the first rung and retained at or adjacent its opposite end to a second mounting plate which is retained in the second receiving opening of the mounting bracket, the second steel cable positioned adjacent a lengthwise side of the separate service loop opposite to the lengthwise side where the first steel cable is positioned.

17. The apparatus in accordance with claim 16 wherein a separate service loop contains only power cables.

18. The apparatus in accordance with claim 16 wherein a separate service loop contains only hydraulic hose.

19. The apparatus in accordance with claim 16 wherein the separate service loop contains power cables and hydraulic hoses.

20. The apparatus in accordance with claim 16 further comprising:
  a. the first steel cable foamed of an interior steel rope at least partially encased in a rubber hose and having a disk affixed to the inner steel rope by which the first steel cable is retained on the first mounting plate; and
  b. the second steel cable formed of an interior steel rope at least partially encased in a rubber hose and having a disk affixed to the inner steel rope by which the second steel cable is retained on the second mounting plate.

21. The apparatus in accordance with claim 16 further comprising:
  a. the first steel cable formed of an interior steel rope at least partially encased in a rubber hose and having at least a pair of spaced apart disks affixed to the inner steel rope, the first steel cable is retained on the first mounting plate by one of the disks; and
  b. the second steel cable formed of an interior steel rope at least partially encased in a rubber hose and having at least a pair of spaced apart disks affixed to the inner steel rope, the second steel cable is retained on the second mounting plate by one of the disks.

22. The apparatus in accordance with claim 15 further comprising:
  a. the oil derrick including an oil derrick end, each separate service loop having a second end adjacent the oil derrick end, a given last rung located a given distance from the oil derrick end;
  b. the oil derrick end having a mounting bracket affixed to the oil derrick end, the mounting bracket having a third receiving opening and a spaced apart fourth receiving opening;
  c. a third steel cable affixed at one end to the last rung and retained at or adjacent its opposite end to a third mounting plate which is retained in the third receiving opening of the mounting bracket, the third steel cable positioned adjacent one lengthwise side of the separate service loop; and
  d. a fourth steel cable affixed at one end to the last rung and retained at or adjacent its opposite end to a fourth mounting plate which is retained in the fourth receiving opening of the mounting bracket, the fourth steel cable positioned adjacent a lengthwise side of the separate service loop opposite to the lengthwise side where the third steel cable is positioned.

23. The apparatus in accordance with claim 22 wherein a separate service loop contains only power cables.

24. The apparatus in accordance with claim 22 wherein a separate service loop contains only hydraulic hoses.

25. The apparatus in accordance with claim 22 wherein a separate service loop contains power cables and hydraulic hoses.

26. The apparatus in accordance with claim 22 further comprising:
  a. the third steel cable formed of an interior steel rope at least partially encased in a rubber hose and having a disk affixed to the inner steel rope by which the third steel cable is retained on the first mounting plate; and
  b. the fourth steel cable formed of an interior steel rope at least partially encased in a rubber hose and having a disk affixed to the inner steel rope by which the fourth steel cable is retained on the first mounting plate.

27. The apparatus in accordance with claim 22 further comprising:
  a. the third steel cable formed of an interior steel rope at least partially encased in a rubber hose and having at least a pair of spaced apart disks affixed to the inner steel rope, the third steel cable is retained on the first mounting plate by one of the disks; and
  b. the fourth steel cable formed of an interior steel rope at least partially encased in a rubber hose and having at least a pair of spaced apart disks affixed to the inner steel rope, the fourth steel cable is retained on the second mounting plate by one of the disks.

28. The apparatus in accordance with claim 15 wherein each rung is made out of material selected from the group consisting of polyurethane, urethane and rubber-like material.

29. An apparatus to be used with at least one service loop, the at least one service loop having a given length and an outer diameter, the at least one service loop having aligned cables, hoses, or a combination of cables and hoses, the apparatus comprising:
   a. a multiplicity of spaced apart rungs, each rung affixed onto aligned cables, aligned hoses, or aligned combination cables and hoses of the at least one service loop and separated from an adjacent rung by a given lengthwise distance on the at least one service loop, the multiplicity of spaced apart rungs reducing lateral movement of the at least one service loop,
   b. an oil derrick including a top drive, the row of the multiplicity of power cables, hoses, or combination power cables, hoses, or combination power cables and hoses of the first service loop having a first end adjacent the top drive, a given first rung located a given distance from the top drive;
   c. the top drive having a mounting bracket affixed to the top drive, the mounting bracket having a first receiving opening and a spaced apart second receiving opening.

30. The apparatus in accordance with claim 29 wherein each rung is affixed onto each separate cable or hose in the at least one service loop by being cast onto each hose and/or cable in the at least one separate service loop.

31. The apparatus in accordance with claim 29 further comprising:
   a. a first steel cable affixed at one end to the first rung and retained at or adjacent its opposite end to a first mounting plate which is retained in the first receiving opening of the mounting bracket, the first steel cable positioned adjacent one lengthwise side of the at least one service loop; and
   b. a second steel cable affixed at one end to the first rung and retained at or adjacent its opposite end to a second mounting plate which is retained in the second receiving opening of the mounting bracket, the second steel cable positioned adjacent a lengthwise side of the at least one service loops opposite to the lengthwise side where the first steel cable is positioned.

32. The apparatus in accordance with claim 31 further comprising:
   a. the first steel cable formed of an interior steel rope at least partially encased in a rubber hose and having a disk affixed to the inner steel rope by which the first steel cable is retained on the first mounting plate; and
   b. the second steel cable formed of an interior steel rope at least partially encased in a rubber hose and having a disk affixed to the inner steel rope by which the second steel cable is retained on the second mounting plate.

33. The apparatus in accordance with claim 31 further comprising:
   a. the first steel cable formed of an interior steel rope at least partially encased in a rubber hose and having at least a pair of spaced apart disks affixed to the inner steel rope, the first steel cable is retained on the first mounting plate by one of the disks; and
   b. the second steel cable formed of an interior steel rope at least partially encased in a rubber hose and having at least a pair of spaced apart disks affixed to the inner steel rope, the second steel cable is retained on the second mounting plate by one of the disks.

34. The apparatus in accordance with claim 29 further comprising:
   a. the oil derrick including an oil derrick end, the at least one service loop having a second end adjacent the oil derrick end, a given last rung located a given distance from the oil derrick end;
   b. the oil derrick end having a mounting bracket affixed to the oil derrick end, the mounting bracket having a third receiving opening and a spaced apart fourth receiving opening;
   c. a third steel cable affixed at one end to the last rung and retained at or adjacent its opposite end to a third mounting plate which is retained in the third receiving opening of the mounting bracket, the third steel cable positioned adjacent one lengthwise side of the at least one service loop; and
   d. a fourth steel cable affixed at one end to the last rung and retained at or adjacent its opposite end to a fourth mounting plate which is retained in the fourth receiving opening of the mounting bracket, the fourth steel cable positioned adjacent a lengthwise side of the at least one service loop opposite to the lengthwise side where the third steel cable is positioned.

35. The apparatus in accordance with claim 34 further comprising:
   a. the third steel cable formed of an interior steel rope at least partially encased in a rubber hose and having a disk affixed to the inner steel rope by which the third steel cable is retained on the first mounting plate; and
   b. the fourth steel cable formed of an interior steel rope at least partially encased in a rubber hose and having a disk affixed to the inner steel rope by which the fourth steel cable is retained on the first mounting plate.

36. The apparatus in accordance with claim 34 further comprising:
   a. the third steel cable formed of an interior steel rope at least partially encased in a rubber hose and having at least a pair of spaced apart disks affixed to the inner steel rope, the third steel cable is retained on the first mounting plate by one of the disks; and
   b. the fourth steel cable formed of an interior steel rope at least partially encased in a rubber hose and having at least a pair of spaced apart disks affixed to the inner steel rope, the fourth steel cable is retained on the second mounting plate by one of the disks.

37. The apparatus in accordance with claim 29 wherein each rung is removably affixed on each separate service loop.

* * * * *